United States Patent [19]

Brunelle et al.

[11] Patent Number: 5,231,161

[45] Date of Patent: Jul. 27, 1993

[54] METHOD FOR PREPARATION OF MACROCYCLIC POLY(ALKYLENE DICARBOXYLATE) OLIGOMERS FROM BIS(HYDROXYALKYL) DICARBOXYLATES

[75] Inventors: Daniel J. Brunelle, Glenville; John B. McDermott, Rexford, both of N.Y.

[73] Assignee: General Electric Company, Schenectady, N.Y.

[21] Appl. No.: 964,996

[22] Filed: Oct. 22, 1992

[51] Int. Cl.$^5$ ............................................. C08G 63/20
[52] U.S. Cl. .................................. 528/272; 528/302; 528/308; 528/308.6; 528/397; 525/437; 525/444; 524/186; 524/236; 524/320; 524/601; 524/605; 524/714; 524/717
[58] Field of Search ............ 528/272, 302, 308, 308.6, 528/397; 525/437, 444; 524/601, 605, 714, 717, 186, 236, 320

[56] References Cited

U.S. PATENT DOCUMENTS

| | | | |
|---|---|---|---|
| 4,217,438 | 8/1980 | Brunelle et al. | 528/202 |
| 4,368,315 | 1/1983 | Sikdar | 528/198 |
| 4,433,117 | 2/1984 | Takayanagi et al. | 525/425 |
| 5,039,783 | 8/1991 | Brunelle et al. | 528/272 |
| 5,157,103 | 10/1992 | Kantor et al. | 528/272 |

*Primary Examiner*—Samuel A. Acquah
*Attorney, Agent, or Firm*—William H. Pittman

[57] ABSTRACT

Macrocyclic poly(alkylene dicarboxylate) oligomers are prepared in high yield by the reaction of a dicarboxylic acid chloride such as terephthaloyl chloride with at least one bis(hydroxyalkyl) ester such as bis(4-hydroxybutyl) terephthalate, in the presence of a highly unhindered amine or a mixture thereof with at least one other tertiary amine such as triethylamine, in a substantially inert organic solvent such as methylene, chlorobenzene or a mixture thereof. The concentration of the reagents in the reaction mixture are at least 0.08M.

20 Claims, No Drawings

METHOD FOR PREPARATION OF MACROCYCLIC POLY(ALKYLENE DICARBOXYLATE) OLIGOMERS FROM BIS(HYDROXYALKYL) DICARBOXYLATES

This invention relates to the preparation of macrocyclic polyester oligomer compositions.

Linear polyesters such as poly(ethylene terephthalate) and poly(butylene terephthalate) are well known commercially available polymers having advantageous properties including solvent resistance. They are normally prepared by the reaction of a diol with a functional derivative of a dicarboxylic acid, typically a diacid halide or ester.

Recently, methods have been developed for the preparation of macrocyclic poly(alkylene dicarboxylate) oligomer compositions (hereinafter sometimes simply "macrocyclic oligomers"). These compositions are noted for their low viscosity and consequent ease of handling. They are easily converted to linear polyesters by contact with various catalytic materials.

One method for macrocyclic oligomer preparation, disclosed in U.S. Pat. No. 5,039,783, involves the reaction of a diol with a dicarboxylic acid chloride (hereinafter sometimes "diacid chloride") under substantially anhydrous conditions and in the presence of a substantially water-immiscible organic solvent such as methylene chloride and at least one unhindered tertiary amine. Examples of suitable tertiary amines are quinuclidine and 1,4-diazabicyclo[2.2.2]octane (hereinafter "DABCO"). It is necessary to use the unhindered amine in large quantities, typically at least one mole and preferably more than one mole per mole of diol and diacid chloride combined. The reaction temperature is critical and is limited to the range from $-25°$ to $+25°$ C. At higher temperatures a proliferation of side reactions occurs, including reaction of the unhindered amine with methylene chloride or similar compounds employed as solvents and decomposition of the acylammonium salt formed by the reaction of the amine with the diacid chloride.

A variation of this method is described in copending, commonly owned application Ser. No. 07/709,256. It uses only a catalytic amount of the unhindered amine, with the remainder thereof being replaced by an acid-accepting amount of at least one other tertiary amine selected from the group consisting of trialkylamines and heteroaromatic tertiary amines. This method is advantageous in that the other amines are less expensive than the unhindered amines and reaction temperatures are not as critical, temperatures from $-5°$ to about 40° C. typically being employed. However, a further disadvantage of both of these methods is the necessity to employ expensive dicarboxylic acid chlorides in large amounts.

The employment of bis(hydroxyalkyl dicarboxylates) (hereinafter sometimes "bis-esters") in the synthesis of individual macrocylcic oligomers is known in the art. For example, Müller et al., *Makromol. Chem.*, 184, 2487-2495 (1983), describes the reaction of bis(2-hydroxyethyl) terephthalate with terephthaloyl chloride in the presence of magnesium powder and dry pyridine, to form a cyclic poly(ethylene terephthalate) dimer. Similar methods are disclosed in Zahn et al., *Chem. Ber.*, 103, 3041-3049 (1970), and in Peebles et al., *J. Poly. Sci.*, Part A-1, 7, 479-496 (1969).

Such a procedure might be expected to decrease the cost of producing macrocyclic oligomers, since the bis-esters can be easily prepared by reaction of the corresponding diol and alkyl (usually methyl) dicarboxylate and can then replace a substantial proportion of the diacid chloride. However, the reaction described in the Müller et al. paper was conducted in toluene under high dilution conditions, and the yield was only 31% after 7 days. Such conditions and yields are obviously unacceptable from a commercial standpoint.

The present invention provides an alternative method for preparing macrocyclic oligomers. It is substantially less expensive than the simple diacid chloride method, since it replaces a large proportion of the diacid chloride with the less expensive bis-ester. Moreover, the reaction takes place in a reasonable time and produces the macrocyclic oligomers in substantially higher yield than the prior art methods.

Accordingly, the invention is a method for preparing a cyclic poly(alkylene dicarboxylate) oligomer composition which comprises contacting at least one dicarboxylic acid chloride of the formula

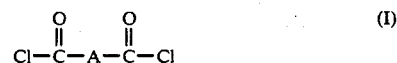

with an approximately equimolar amount of at least one bis(hydroxyalkyl) ester of the formula

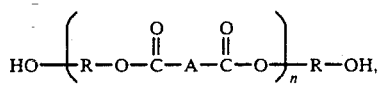

wherein each A is independently a m- or p-linked divalent monocyclic aromatic or alicyclic radical, R is an alkylene or mono- or polyoxyalkylene radical containing a straight chain of about 2-8 atoms and n is from 1 to about 5, in solution in a substantially inert organic solvent and in the presence of at least one unhindered tertiary amine and, optionally, at least one other tertiary amine selected from the group consisting of trialkylamines and heteroaromatic tertiary amines; the concentrations of said dicarboxylic acid chloride and said bis(hydroxyalkyl) dicarboxylate being at least 0.08M.

The A values in formulas I and II may be the same or different m- or p-linked monocyclic aromatic or alicyclic radicals. Included are m- and p-phenylene, substituted derivatives thereof, and similarly structured cyclohexylene and cyclopentylene radicals. The m- and p-phenylene radicals, and especially p-phenylene, are preferred.

The R value may be considered as being derived from a corresponding alkylene glycol or polyalkylene glycol, in which the straight chain connecting the hydroxy groups contains about 2-8 atoms. Suitable alkylene glycols include ethylene glycol, propylene glycol, tetramethylene glycol, hexamethylene glycol and neopentylene glycol. Suitable polyalkylene glycols include diethylene glycol and triethylene glycol. Ethylene glycol and tetramethylene glycol are preferred.

In the bis-esters of formula II, n may be from 1 to about 5 (including fractional values, signifying a mixture of oligomeric esters) and is preferably in the range of 1-3. For brevity, said bis-esters are sometimes designated hereinafter "monomer diol", "dimer diol", etc., according to the value of n. Mixtures of compounds with various n values may be employed. As previously mentioned, such bis-esters may be prepared by the conventional reaction of a dialkyl dicarboxylate such as dimethyl terephthalate, or a similar dialkyl ester of a linear poly(alkylene dicarboxylate) oligomer, with a diol of the formula HO—R—OH.

The crux of the invention is the reaction between a diacid chloride of formula I and a bis-ester represented by formula II. As organic solvents in said reaction, various water-immiscible non-polar organic liquids may be employed. Illustrative liquids of this type are aromatic hydrocarbons such as toluene and xylene; substituted aromatic hydrocarbons such as chlorbenzene, o-dichloroenzene and nitrobenzene; and chlorinated aliphatic hydrocarbons such as chloroform, methylene chloride, trichloroethane and tetrachloroethane. Chlorinated aliphatic and aromatic hydrocarbons, especially aliphatic, are often preferred with methylene chloride frequently being most preferred because of its availability and particular suitability. Mixtures of solvents may also be employed.

In the method described in the aforementioned U.S. Pat. No. 5,039,783 and application Ser. No. 07/709,256, it was frequently advantageous to employ, in combination with the substantially inert solvent, a more polar combined oxygen-containing solvent such as tetrahydrofuran. The purpose of the more polar solvent was to facilitate dissolution of the diol reagent. Since a diol is not employed in the present invention, the employment of such a solvent is not necessary.

Also employed in the method of the invention is at least one unhindered tertiary amine. The essential feature of this amine is the lack of a substantial amount of steric hindrance around the basic nitrogen atom. Preferred amines of this type are polycyclic compounds with a tertiary nitrogen in the bridgehead position, as illustrated by hexamethylenetetramine, quinuclidine and 1,4-diazabicyclo[2.2.2]octane (DABCO), which have the following formulas, respectively:

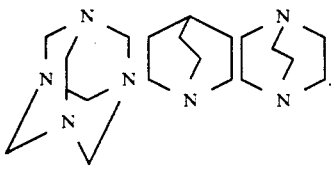

Also suitable, though less preferred because they produce the macrocyclic oligomers in lower yield, are N-methyl heterocyclic monoamines such as N-methylpyrrolidine and N-methylpiperidine, especially the former.

Finally, the method of the invention optionally employs at least one other tertiary amine selected from the group consisting of trialkylamines and heteroaromatic tertiary amines. Suitable amines for this purpose generally comprise those which are oleophilic; i.e., which are soluble in and highly active in organic media, especially those used in the method of this invention. More particularly, said amines generally include those known to be useful in the preparation of polycarbonates. Reference is made, for example, to the tertiary amines disclosed in U.S. Pat. Nos. 4,217,438 and 4,368,315, the disclosures of which are incorporated by reference herein. They include trialkylamines in which the alkyl groups contain about 1-6 carbon atoms, such as triethylamine, tri-n-propylamine, diethyl-n-propylamine and tri-n-butylamine, and heterocyclic amines such as pyridine and 4-dimethylaminopyridine (which, for the purposes of this invention, contains only one active amine group). The most useful amines of this type are trialkylamines containing no branching on the carbon atoms in the 1- and 2-positions. Especially preferred are tri-n-alkylamines in which the alkyl groups contain up to about 4 carbon atoms. Triethylamine is most preferred because of its particular availability, low cost and effectiveness in the method of the invention.

According to the invention, the diacid chloride and bis-ester are employed in approximately equimolar amounts. Some variation, generally no more than about 5%, is permissible. Molar ratios of total amines to the combination of bis-ester and diacid chloride are usually in the range of about 1.0–1.5:1.

When the optional other tertiary amine is present, it usually comprises about 75–99 and preferably about 92–97 mole percent of total amines. Thus, the purpose of the unhindered amine is, at least in part, catalytic and that of the other amine, if present, is to serve as an acid acceptor.

The concentrations of the diacid chloride and bis-ester are also a critical aspect of the invention. It has been found that minimum reaction time and maximum yield are dependent on a relatively concentrated solution of the two reagents. The concentration of each should be at least 0.08M, and is usually from 0.08 to about 0.50 and preferably about 0.25M.

The procedure employed when the method of this invention is practiced will vary somewhat depending on the solubility of the reactants in the solvents employed. Bis(4-hydroxybutyl) terephthalate is readily soluble in such liquids as methylene chloride and chlorobenzene. It is therefore feasible to employ "pseudo-high dilution" conditions; that is, to add solutions of the two reagents simultaneously to a solution of the amines in a reaction vessel. Reaction temperatures are typically in the range of about 20°–65° C., and ordinarily about 25°–40° C. when the solvent is wholly or partially methylene chloride.

Mixed bis(4-hydroxybutyl) terephthalates, in which the average value of n is greater than 1, are substantially less soluble in methylene chloride at room temperature. When they are employed, it is usually necessary to maintain the solution at a higher temperature, typically about 35° C., to ensure homogeneity. Bis(2-hydroxyethyl) terephthalates, both monomeric and oligomeric, are still less soluble, and it is frequently necessary to charge them initially to the reaction vessel and gradually introduce the diacid chloride. However, mixtures of bis(4-hydroxybutyl) and bis(2-hydroxyethyl) terephthalates are substantially more soluble than either molecular species individually, and normal pseudo-high dilution techniques may therefore be used.

Following the reaction between the diacid chloride and bis-ester, it may be necessary to remove linear polyester in the form of oligomers and high polymer. The high polymer portion of the linears is insoluble in the solvents employed, and may be removed by filtration. Linear oligomers are most conveniently removed by column chromatography through silica gel or the like. After high polymer and linear oligomers have been removed, the solvent may be removed by distillation or evaporation and the cyclic oligomers recovered in substantially pure form.

The method of this invention is illustrated by the following examples. All percentages are by weight unless otherwise indicated.

EXAMPLE 1

A bis-ester mixture was prepared by the reaction of 1 mole of dimethyl terephthalate with 3 moles of 1,4-butanediol in the presence of a catalytic amount of tetraisopropyl titanate. It was found upon high pressure liquid chromatographic analysis to contain 46%, 32%, 14% and 3% monomer, dimer, trimer and tetramer diols respectively. Unreacted butanediol was removed by washing with water in a blender. The monomer diol was then isolated by extraction with a 1:1 (by volume) mixture of methanol and water, followed by evaporation of the solvents.

A solution of 3.103 grams (10 mmol.) of monomer diol in 10 ml of methylene chloride and a solution of 2.03 grams (10 mmol.) of terephthaloyl chloride in 10 ml. of chlorobenzene were simultaneously added over 30 minutes to a stirred solution of 111 mg. (1 mmol.) of DABCO and 2.52 grams (25 mmol.) of triethylamine in 80 ml. of methylene chloride. The mixture was stirred for an additional 5 minutes and filtered through a filter aid material to remove linear polymer. The filtrate was washed with 5M aqueous hydrochloric acid solution, with water and with saturated sodium chloride solution and was filtered through phase separation paper. Upon vacuum evaporation of solvent, there was obtained 3.662 grams (83% of theoretical) of macrocyclic poly(1,4-butylene terephthalate) oligomers. High pressure liquid chromatographic analysis showed the presence of 90% cyclic dimer and 10% cyclic trimer.

EXAMPLES 2-3

The procedure of Example 1 was repeated at molar concentrations of 0.2 and 0.25. The yields were 85% and 75% of theoretical, respectively.

EXAMPLE 4

The procedure of Example 1 was repeated, substituting isophthaloyl chloride for the terephthaloyl chloride on an equimolar basis. A mixed macrocyclic oligomer mixture was obtained in 62% yield.

EXAMPLE 5

The procedure of Example 1 was repeated, substituting isophthaloyl chloride for half the terephthaloyl chloride on an equimolar basis. A mixed macrocyclic oligomer mixture was obtained in 40% yield.

EXAMPLE 6

The procedure of Example 1 was repeated, employing a 5:1 molar mixture of bis(4-hydroxybutyl) and bis(2-hydroxyethyl) terephthalates. A mixed macrocyclic oligomer mixture was obtained in 55% yield.

EXAMPLE 7

A mixture of bis(4-hydroxybutyl) terephthalate oligomers similar to that prepared in Example 1 was prepared and found to contain 62% monomer diol, 26% dimer diol, 10% trimer diol and the remainder higher oligomers. A solution of 10 mmol. thereof in 10 ml. of warm methylene chloride was added concurrently with a solution of 10 mmol. of terephthaloyl chloride in 10 ml. of chlorobenzene to a reaction vessel containing DABCO and triethylamine in methylene chloride, to produce a solution 0.25M in the two reactants. Upon workup in accordance with Example 1, an oligomeric product was obtained in 85% yield. It contained about 5% linear oligomers, with the balance being macrocyclic oligomers.

EXAMPLE 8

Mixed linear bis(2-hydroxyethyl) and bis(4-hydroxybutyl) terephthalates were obtained as described in Example 1, using a 5:1 molar ratio of butanediol to ethylene glycol. It was converted to macrocyclic oligomers by reaction with terephthaloyl chloride as in Example 1, except that the concentration of the reactants was 0.25M and reagent addition was over a period of 1 hour. An 82% yield of macrocyclic oligomers was obtained.

What is claimed is:

1. A method for preparing a cyclic poly(alkylene dicarboxylate) oligomer composition which comprises contacting at least one dicarboxylic acid chloride of the formula

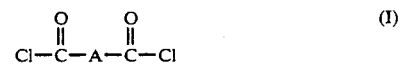

with an approximately equimolar amount of at least one bis(hydroxyalkyl) ester of the formula

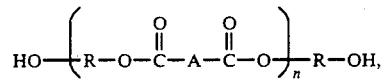

wherein each A is independently a m- or p-linked divalent monocyclic aromatic or alicyclic radical, R is an alkylene or mono- or polyoxyalkylene radical containing a straight chain of about 2-8 carbon atoms and n is from 1 to about 5, in solution in a substantially inert solvent and in the presence of at least one unhindered tertiary amine and, optionally, at least one other tertiary amine selected from the group consisting of trialkylamines and heteroaromatic tertiary amines; the concentrations of said dicarboxylic acid chloride and said bis(hydroxyalkyl) dicarboxylate being at least 0.08M.

2. A method according to claim 1 wherein R is alkylene.

3. A method according to claim 2 wherein R is ethylene or 1,4-butylene.

4. A method according to claim 3 wherein each A is independently m- or p-phenylene.

5. A method according to claim 2 wherein n is in the range of 1-3.

6. A method according to claim 2 wherein n is 1.

7. A method according to claim 6 wherein solutions of the dicarboxylic acid chloride and bis(hydroxyalkyl) ester are added simultaneously to a solution of the amines.

8. A method according to claim 2 wherein the reaction temperature is in the range of about 20°-65° C.

9. A method according to claim 2 wherein the solvent is a chlorinated aliphatic or aromatic hydrocarbon or a mixture thereof.

10. A method according to claim 9 wherein the solvent is at least one of methylene chloride and chlorobenzene.

11. A method according to claim 2 wherein the unhindered amine is hexamethylenetetramine, quinuclidine or 1,4-diazabicyclo[2.2.2]octane.

12. A method according to claim 11 wherein said other tertiary amine is also present.

13. A method according to claim 12 wherein the other amine is a trialkylamine or heteroaromatic tertiary amine.

14. A method according to claim 13 wherein the other amine is triethylamine.

15. A method according to claim 12 wherein the other amine comprises about 75-99 mole percent of total amines.

16. A method according to claim 11 wherein the concentration of each of the dicarboxylic acid chloride and bis(hydroxyalkyl) ester is from 0.08 to about 0.50M.

17. A method according to claim 11 wherein the molar ratio of total amines to the combination of dicarboxylic acid chloride and bis(hydroxyalkyl) ester is in the range of about 1.0-1.5:1.

18. A method for preparing a macrocyclic poly(1,4-butylene terephthalate) oligomer mixture which comprises simultaneously adding, to a solution of triethylamine and highly unhindered amine selected from the group consisting of hexamethylenetetramine, quinuclidine or 1,4-diazabicyclo[2.2.2]octane comprising about 92-97 mole percent triethylamine, a solution of terephthaloyl chloride and a solution of at least one bis(hydroxyalkyl) ester of the formula

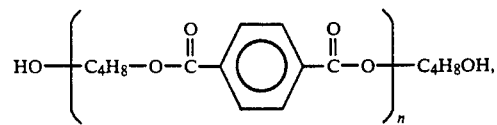

wherein n is in the range of 1-3; the solvent in said solutions being at least one of methylene chloride and chlorobenzene, the molar ratio of total amines to the combination of terephthaloyl chloride and bis(4-hydroxybutyl) terephthalate being in the range of about 1.0-1.5:1 and the reaction temperature being in the range of about 25°-40° C.

19. A method according to claim 18 wherein n is 1.

20. A method according to claim 19 wherein the unhindered amine is 1,4-diazabicyclo[2.2.2]octane.

* * * * *